United States Patent [19]

Stehle et al.

[11] Patent Number: 4,763,793

[45] Date of Patent: Aug. 16, 1988

[54] INSTALLATION FOR SORTING ARTICLES BY WEIGHT AND SHAPE

[75] Inventors: Wolfgang Stehle, Schlier; Dieter Fuchs, Waldburg, both of Fed. Rep. of Germany

[73] Assignee: Maschinenfabrik Bezner GmbH & Co. KG, Ravensburg, Fed. Rep. of Germany

[21] Appl. No.: 807,781

[22] Filed: Dec. 11, 1985

Related U.S. Application Data

[63] Continuation of Ser. No. 656,349, Oct. 1, 1984, abandoned.

[30] Foreign Application Priority Data

Sep. 30, 1983 [DE] Fed. Rep. of Germany ....... 3345496
Mar. 1, 1984 [DE] Fed. Rep. of Germany ....... 3407611
Apr. 21, 1984 [DE] Fed. Rep. of Germany ....... 3415090

[51] Int. Cl.$^4$ ............................................. B07C 1/02
[52] U.S. Cl. ..................... 209/616; 209/629; 209/696; 209/704; 209/707; 209/930; 198/692
[58] Field of Search ............ 209/615, 616, 631, 630, 209/635, 642, 645, 651, 654, 656, 691, 692, 694, 696, 700, 707, 693, 920, 930, 629; 198/692, 693, 817

[56] References Cited

U.S. PATENT DOCUMENTS

| | | | |
|---|---|---|---|
| 1,016,740 | 2/1912 | Ellison | 198/692 |
| 1,046,853 | 12/1911 | Proal, Jr. | 198/346 |
| 1,473,333 | 11/1923 | Bickley | 209/704 |
| 1,616,693 | 3/1925 | Havighorst | 209/705 |
| 2,633,970 | 1/1951 | Robinson | 198/346 |
| 2,937,748 | 5/1960 | Stevens | 209/615 |
| 3,595,389 | 5/1970 | Morgan | 209/930 |
| 3,707,228 | 12/1972 | Conrad | 209/704 |
| 3,804,248 | 4/1974 | Talamantz | 209/930 |
| 3,888,351 | 6/1975 | Wilson | 209/930 |
| 4,187,775 | 2/1980 | Flender | 209/930 |
| 4,232,506 | 11/1980 | Studer | 209/616 |

FOREIGN PATENT DOCUMENTS

| | | | |
|---|---|---|---|
| 62619 | 6/1892 | Fed. Rep. of Germany | 209/692 |
| 735290 | 1/1938 | Fed. Rep. of Germany | |
| 740839 | 8/1940 | Fed. Rep. of Germany | |
| 874274 | 2/1951 | Fed. Rep. of Germany | |
| 2928886 | 1/1980 | Fed. Rep. of Germany | 209/930 |
| 1351523 | 12/1962 | France | |
| 2420376 | 11/1979 | France | 209/615 |
| 566183 | 12/1944 | United Kingdom | 209/630 |

*Primary Examiner*—R. B. Reeves
*Assistant Examiner*—Donald T. Hajec
*Attorney, Agent, or Firm*—Spencer & Frank

[57] ABSTRACT

A sorting installation for separating a first type of articles from a second type of articles fed mixed to the sorting installation. The articles of the first type are relatively light and substantially two-dimensional, while the articles of the second type are relatively heavy and substantially three-dimensional. There is provided an article-supporting surface which receives the first and second type of articles in a generally mixed state and which has a length dimension and a width dimension perpendicular to the length dimension. The article-supporting surface is inclined to the horizontal in a direction parallel to the width dimension for causing primarily the second type of articles to move by gravity downwardly on the article-supporting surface transversely to the length dimension and laterally off the article-supporting surface. There is also provided a conveyor travelling parallel to the article-supporting surface in a travelling direction oriented at an angle to the width dimension for forwarding primarily the first type of articles on the article-supporting surface parallel to the travelling direction and transversely to the width dimension.

12 Claims, 4 Drawing Sheets

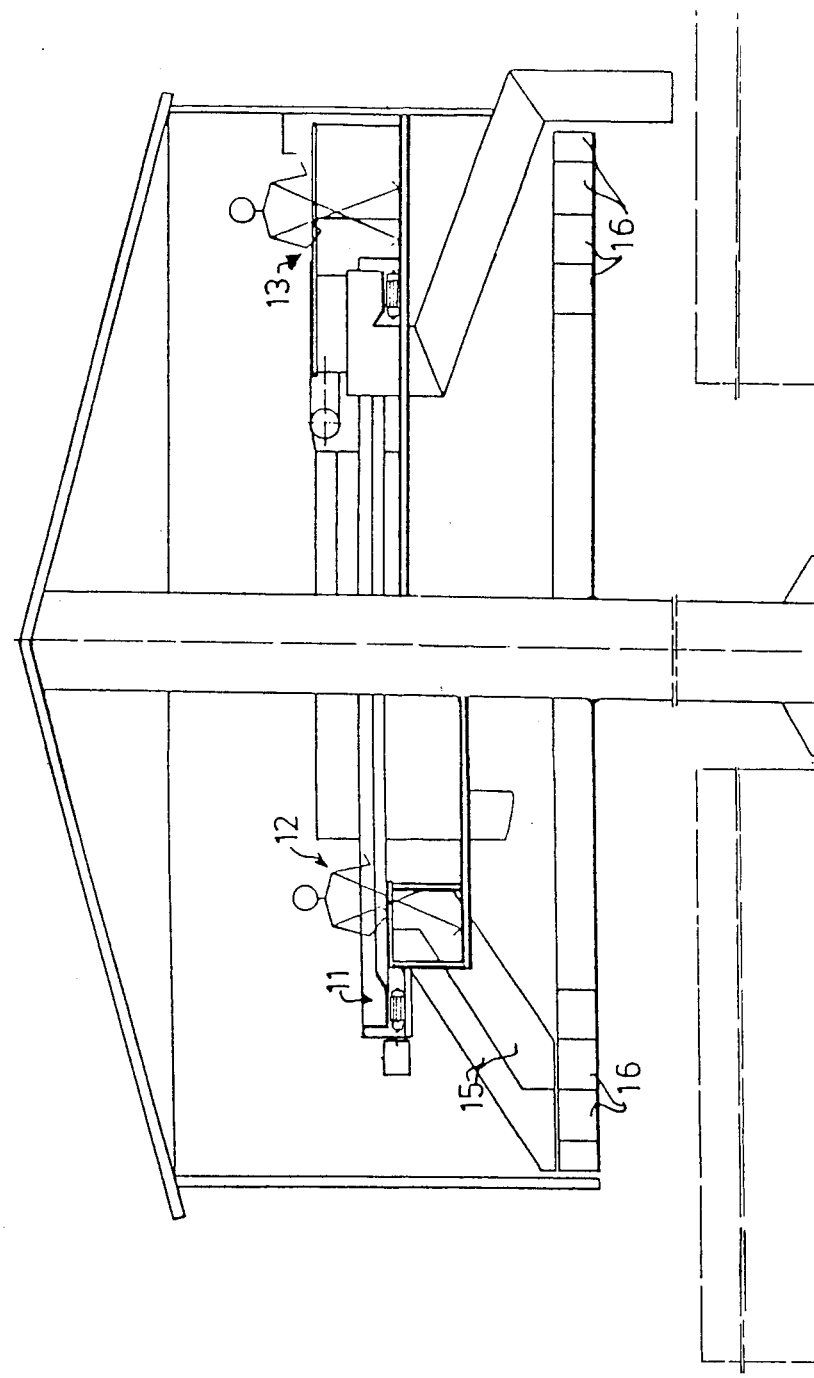

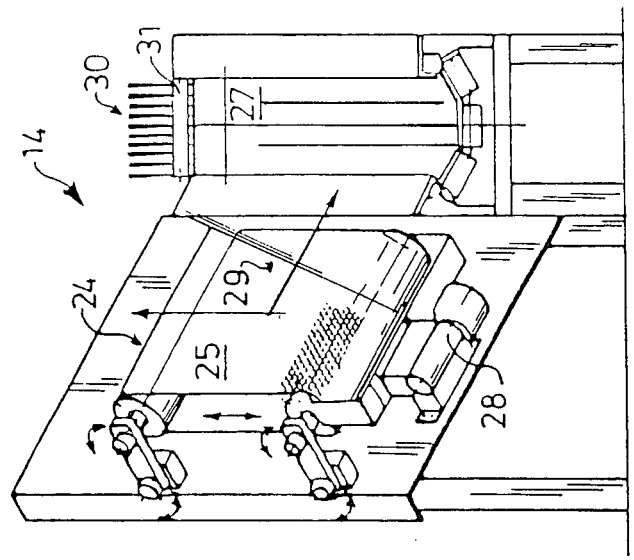
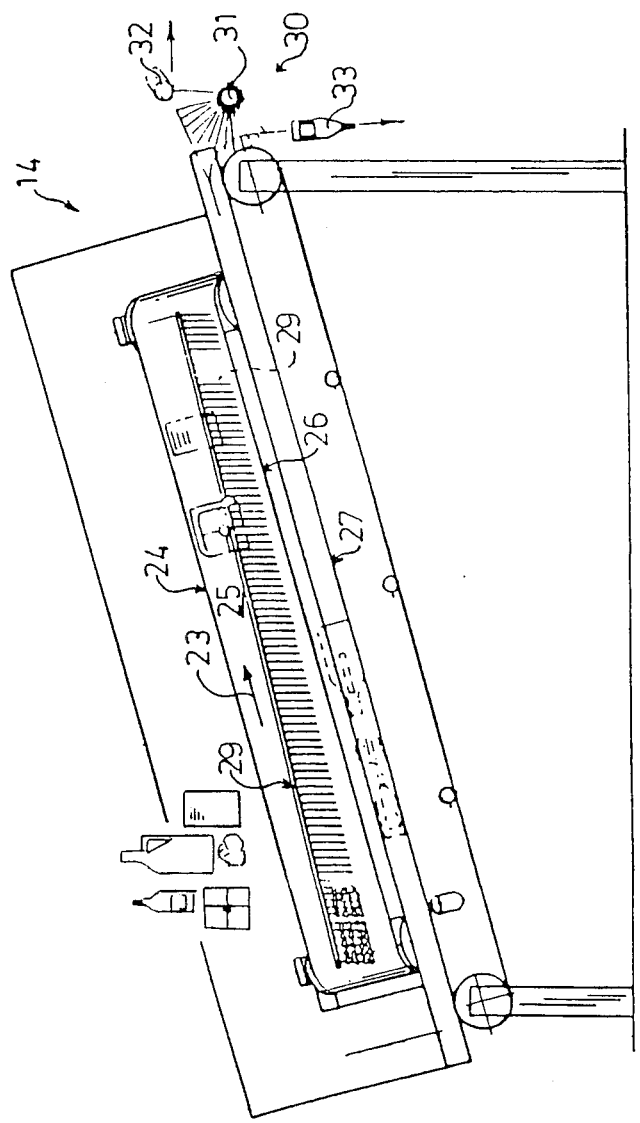
Fig 4
Fig 3

INSTALLATION FOR SORTING ARTICLES BY WEIGHT AND SHAPE

This application is a continuation of application Ser. No. 656,349 filed Oct. 1, 1984, now abandoned.

CROSS-REFERENCE TO RELATED APPLICATION

This application contains subject matter related to application Ser. No. 06/796,576 filed Oct. 23, 1985.

FIELD OF THE INVENTION

The invention relates to a sorting installation, particularly for sorting out valuable substances from domestic garbage, industrial garbage, voluminous garbage, dry garbage and/or problematic and dangerous substances, which has a transport means arranged in an upper plane, which feeds the material to be sorted to at least two sorting work stations, whilst sorting shafts leading downwards to the respective receptacles for the individual substances to be sorted out are associated with the sorting work stations.

PRIOR ART

In the context of increasing awareness of the environment, numerous campaigns for the recycling of waste substances are currently in progress. For example, the glass containers with different filling shafts for different types of glass and waste paper collections have become known in particular. Sorting installations are also known upon which a manual or mechanical sorting out of the valuable substances into tanks occurs on transport belts.

According to the evaluation of experiments, the valuable substances collected do exhibit a uniform proportion of different valuable substances distributed over the year. The proportion of these substances per truckload or per collection area, or after particular public holidays or after the holiday season etc., can deviate quite substantially from the average annual distribution. It would not be economically justifiable to adapt a sorting installation to these peak loads, because a three-fold to four-fold increase of the normal capacity would be necessary. If a sorting installation were dimensioned for peak loads, it would therefore be utilized only to approximately 25% of capacity in normal cases.

In a known installation (U.S. Pat. No. 3,595,389) the valuable substances are fed via conveyor belts to various work stations which exhibit a plurality of dropping shafts for different valuable substances. Then, on the other hand, conveyor belts for further transport are provided below the sorting shafts. However, this installation has the disadvantage that its construction requires many conveyor belts, occupies much space and is prone to faults.

Another known sorting apparatus (German Pat. No. 874,274) employs as conveyor means annular disks which are cheaper and less fault-prone than transport belts. However, this installation is also unsuitable for processing cheaply a large incidence of valuable materials to be removed. In particular, transport belts are again used for transporting away the valuable substances.

The known installations are therefore adaptable to different quantities and sorting assignments only by high capital costs and in some cases high manning requirements. Furthermore, customary belts are particularly not suitable for the transport of dry garbage, because on the one hand specific valuable substances may become jammed or entangled (sound tape cassettes for example) and on the other hand transport belts are expensive.

SUMMARY OF THE INVENTION

The underlying aim of the invention is to develop a compact sorting installation for substances of the type initially stated, which is capable of flexible use, exhibits low production and operating costs and is practicable in service. It is furthermore the aim of the invention to propose a method of sorting valuable substances whereby it is possible to sort particularly economically. The disadvantages of the prior art should also be avoided. It is a further aim to form specific components of the installation so that they can also be used for sorting when detached from the remainder of the installation.

The invention starts from the realization that the disadvantages which arise in the prior art can be overcome only by an extremely flexible system for sorting the valuable substances. At the same time, minimum capital costs and the smallest possible manning requirements should be aimed at. The installation according to the invention has the particular advantage that very widely different quantities can be processed and very widely different sorting functions can be performed. Due to the revolving sorting table, unsorted material passes repeatedly to a next, or ultimately to the same sorting station in order to be finally sorted out. The residual fraction is discharged selectively between the sorting stations, at the start or at the end of the sorting stage. Due to the special mode of construction of the sorting installation, it is possible to dispense largely with conventional belts, which leads to a substantial cost economy. The sorting table is virtually an annular revolving disk which is insensitive to dirt and furthermore inexpensive.

According to the invention, concentrically oriented removal ducts may be arranged below the annular sorting table. However, depending upon local conditions, straight or curved removal ducts or conveyor belts or containers may also be present below the dropping shafts.

Further measures to achieve the aim of the invention, and particularly for the advantageous further development and improvement of the installation according to the invention, are provided. The construction of the sorting table as divided plane annuli revolving horizontally in the same or opposite directions with variable transport speeds permits an infinite adaptation of the installation to the incident quantity of valuable substances. The fractions already separated before the sorting table are then fed to the concentrically oriented annuli.

An advantageous construction of the invention provides sorting platforms which are arranged as slidable circular segments inside and/or outside the annular sorting table. In case of need, they may travel with the sorting table through a certain angular range of rotation;

The same or different sorting shafts are associated with the sorting platform, according to which sorting functions have to be performed. Normally each sorting platform associated with a specific sorting ring has the same sorting function, that is to say, the same valuable substances are sorted out into the sorting shafts at the first sorting platform as at the following ones. The sorting shafts are respectively connected to a specific removal duct below the sorting table.

A convenient further development provides that a preliminary sorting stage, particularly for sorting out large cartons, precedes the sorting table. Packagings such as plastic bags, cartons etc may also be opened, and voluminous goods undergo preliminary comminution, by appropriate tools in the preliminary sorting stage. Due to this preliminary sorting, it is unnecessary for the sorting table to be dimensioned for such sizes of large carton and bulky valuable substances. A revolving magnetic band for the removal of sheet metal parts may also be provided above the preliminary sorting stage After the preliminary sorting a sorting machine is provided which performs a separation of the two-dimensional from the three-dimensional parts by a combined belt system. A separation of heavy three-dimensional parts from two-dimensional parts is achieved by the frictional adhesion of the inclined band and also, additionally or alternatively, by a guard curtain to restrain the light two-dimensional parts, by the trampoline effect on landing and by the vibrational movement of the vibrator device, and also by gravity. The fractions thus separated are fed to the two concentrically oriented rings of the the sorting table.

Furthermore, a brush wheel is advantageously at the end of the sorting machine, the soft bristles of which throw away tangentially lighter parts such as paper, plastic or the like, whereas heavier parts such as glass bottles remain largely uninfluenced.

This sorting machine can also be used independently of the remainder of the installation for minor sorting functions.

As a further development of the invention, the sorted valuable substances are dropped in the removal duct below the sorting table, in which the material present therein is transported to an outlet aperture to be fitted at any desired point. The outlet apertures are operated manually or mechanically.

The individual work stations may be constructed either as manual or automatic work stations for sorting. For example, the installation may particularly be additionally equipped subsequently with a mechanical picking station, for the fully automatic color sorting of bottles for example.

It is provided as a further development of the invention that further intermediate bunker paths and/or locking-out paths are provided beside the sorting table for the intermediate storage of the valuable substances or for the arrangement of special work stations. By this measure the capacity of the installation can be increased at will, whilst, particularly, a sorting of valuable substances which exceeds the number of existing removal ducts is possible. It the removal ducts are occupied by specific valuable substances to be received therein, then other valuable substances may be stored in the intermediate bunker stage in order to be processed in a special sorting operation later.

According to the method according to the invention as claimed in the subordinate claims, the installation according to the invention can be adapted optimally to the particular conditions of each case.

It is therefore a central feature of the invention, inter alia, that all the sorting stations are constructed identically and that access to the removal ducts and containers into which the different valuable substances are sorted, is possible at any desired point of the sorting table. In this case the removal ducts nay be extended outwards or inwards, in order to create the necessary number of different removal ducts. Obviously, the sorting work stations may be arranged both inside and also outside the revolving sorting table. Further particulars according to the invention are described below.

BRIEF DESCRIPTION OF THE DRAWINGS

An advantageous and convenient example of construction of the invention is illustrated in the drawings and described more fully in the description below.

In the drawing:

FIG. 2 shows a section along the line I-I in FIG. 1, FIG. 3 shows a side elevation of the sorting machine and FIG. 4 shows a plan of the installation according to FIG. 3, FIGS. 5 and 6 show a further variant of construction of a sorting machine.

DETAILED DESCRIPTION

Figure 1:
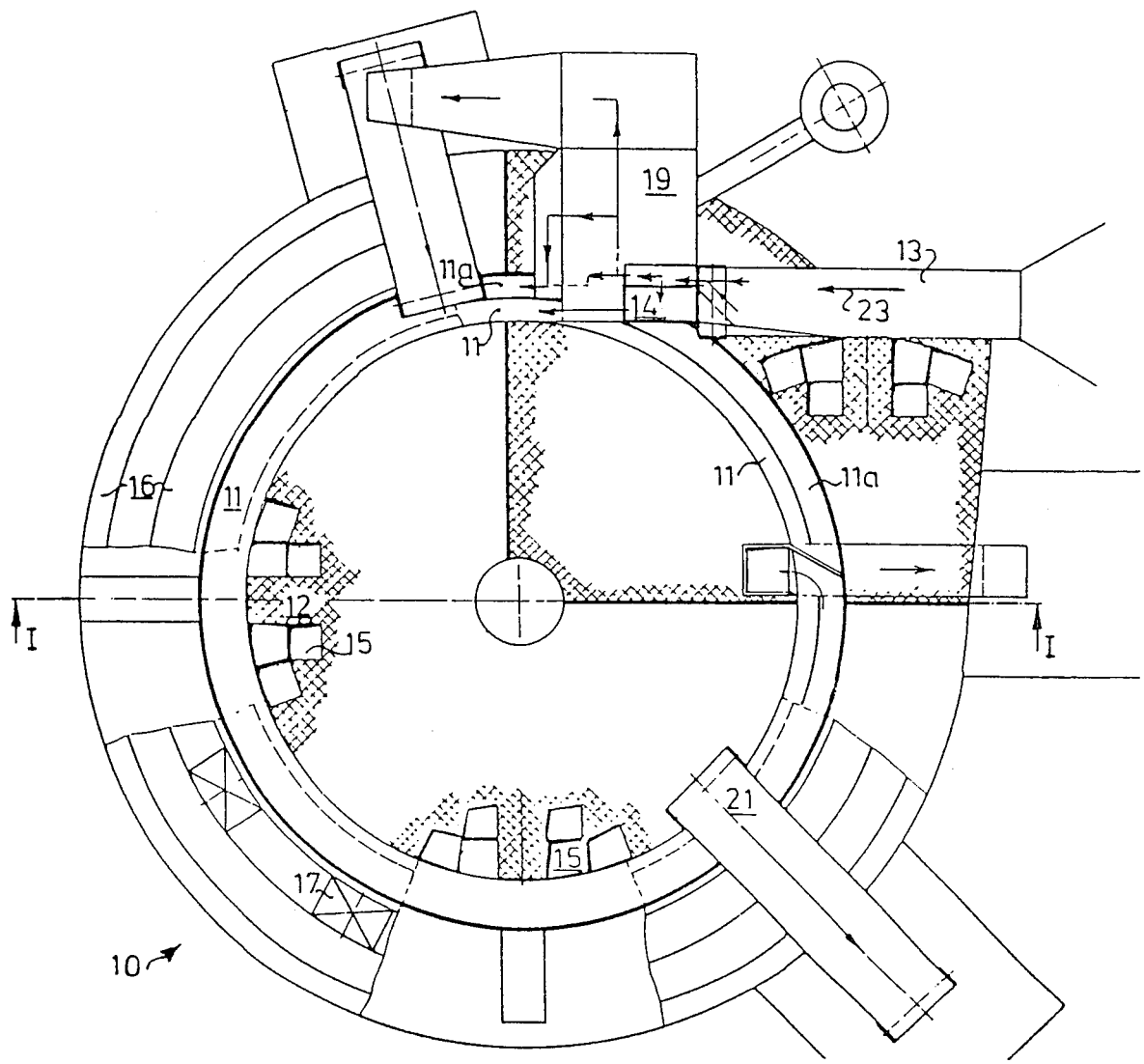
FIG. 1 shows a plan of the apparatus according to the invention with corresponding sections to represent the underlying plane.

The sorting installation 10 illustrated in FIGS. 1 and 2 consist initially of an annular plane horizontally revolving sorting table 11, which is divided into two concentrically revolving annuli 11, 11a, the speeds of revolution of which are infinitely controllable. A plurality of identical sorting platforms 12, which are associated with the sorting table 11 inside and outside the annulus, may be constructed as manual or automatic picking stations. The sorting platforms are of circular segmental construction and mounted fixed or rotatably, so that they can follow the revolving sorting table when controlled via a pedal switch. Each sorting platform can accommodate a plurality of sorters, four for example, in order to deal with the relevant incidence of work. The sorting table 11 is preceded by a preliminary sorting stage 13, on which large cartons are gripped by a manually guided suction lift, for example, and fed directly to a separate conveyor belt or to a container. By this means it is unnecessary for the sorting table 11 to be constructed for the size of such large objects. A sorting stage 14 provided additionally between the preliminay sorting stage 13 and the sorting table 11 is explained as an independent subassembly at the end of the description. The incoming valuable substances are carried from the preliminary sorting stage 13 onto the sorting stage 14 or the revolving sorting table 11.

Each sorting platform 12 is equipped with sorting shafts 15, which lead to removal ducts 16 which are arranged parallel or on concentric tracks below the sorting table. The removal ducts 16 have, at one or more points, passage apertures 17 through which the valuable material collected in the removal ducts is discharged. Containers or conveyor belts which transport the sorted valuable substances away from the sorting installation may stand below the passage apertures 17. However, the sorting shaft may also be connected to straight or curved removal ducts, or directly to containers.

The sorting installation according to the invention will now be described more fully with reference to its function.

The valuable substances to be sorted, such as glass, board, paper, plastic etc., are fed unsorted to the sorting installation and pass to the preliminary sorting stage 13, where the large cartons and objects which cannot be sorted in the installation are first of all removed from the transport belt. If the incidence of large cartons so permits, a sorting out of further valuable substances such as glass, paper, plastic etc. may already be performed at this preliminary sorting station. For this purpose the preliminay sorting station is likewise equipped with corresponding sorting shafts 15.

Analogously to this sorting platform, a further two, three or four sorting platforms 12 are provided at the sorting table 11. Due to their circular arrangement, the greatest mutual distance of the sorting stations is only approximately 5 m. This brings with it the advantage that, if two rings 11, 11a are provided, the sorters can be occupied flexibly at each sorting ring according to the workload. As a general principle, each sorter at a ring sorts everything.

The material not sorted out from the preliminary sorting stage 13 is transferred to the annularly revolving sorting table having a diameter of approximately 7 m via the conveying stage 14. The sorting platforms 12 are arranged on the internal and/or external edge of the sorting table 11. A revolving magnetic band 21, which is arranged transversely either on the preliminary sorting stage 13 or on the sorting table 11, is conveniently provided.

Due to the idea of the invention it is possible for all the valuable substances to be sorted out at all the sorting platforms. Consequently, valuable substances which either were overlooked or could not be sorted out due to overloading at previous sorting platforms are likewise handled again. If overloading occurs, then a fourth sorting platform, for example, is likewise manned, and in the case of further fractions, the removal duct located beneath it is extended by further chambers.

The voiding of the removal ducts is effected in that a centrally mounted pusher revolves all round in the removal ducts 16 and transports the material presert therein to an aperture 17 to be arranged at any desired point. The drive of the pusher is effected, for example, via a gear motor influencing the rubber wheel.

In order to increase the discharge capacity, the speed of rotation of the pusher, or the number of the pushers, or both, may be increased. The capacity of the removal region is sufficient even if the capacity of the entire installation is increased substantially by the addition of sorting machines.

An extension of the installation is possible, and presents no problems, if any desired number of "sorting machines" are arranged in stellate configuration round the sorting installation, as described below by way of an example. If these sorting machines are further connected to an intermediate bunker stage, then this results in further advantages for the system. On the one hand, it is possible by means of the intermediate bunker to arrange that the different sorts of valuable substances occurring in batches can be fed uniformly distributed to a sorting machine or manual picking path dimensioned for the statistical incidence of the respective batches. On the other hand, it is possible to store specific sorting functions. These sorting functions can then be performed in a separate operation after the feed of the valuable substances has been stopped.

The following example is presented in this context: the sorting of valuable substances is performed mechanically and manually for a period of six hours per day into the following fractions:cartons paper 1, paper 2, glass white, glass green, glass brown, plastics, ferrous metals and non-ferrous metals. For the removal, five removal ducts 16 are present which receive the various materials. The removal of the fractions in excess of these is effected directly or via corresponding conveyor elements. After switching off the feed of valuable substances to the sorting installation, the residual fraction still to be sorted, which has been stored in an intermediate bunker 19, can be fed to the circular table via a corresponding discharge device. The sorting is then effected either manually or mechanically, as described, whilst the removal occurs via the five removal ducts 16, which have meanwhile been voided of the old fractions. If it is not necessary to exchange the containers used for the principal sorting, then it is only necessary to open by pusher further passage apertures arranged as desired on the outer circle. The various fractions are then dropped by the pusher directly into another container or else onto corresponding conveyor elements. By this procedure the sorting installation can be used for sorting substantially more fractions than there are corresponding removal ducts. Obviously, the installation can be extended with further removal ducts 16 at any time.

FIGS. 3 and 4 show an example of construction of a separate sorting machine 14, which is conveniently arranged between the preliminary sorting stage 13 and the sorting table 11. The incoming mixture of valuable substances is thereby divided into different fractions, particularly into two-dimensional light, and three-dimensional heavy parts, because by this means the subsequent sorting operations can be better planned as a function of the dimensions. The sorting machine 14 consists initially of a wide-dimensioned conveyor belt 24 rising in the transport direction 23 and having a transport plane 25 inclined relative to a horizontal plane. By means of a vibrator device 28, this inclined and rising transport belt 24 is excited into slight oscillatory movement. The conveyor belt surface itself has a high coefficient of friction, with the result that light and/or two-dimensional parts(paper for example) adhere to it and are conveyed in the transport direction 23, remaining on the belt 24. Three-dimensional and/or heavy parts such as bottles etc., by contrast, roll or slide away on the incline and are collected in a plane or troughed conveyor belt 27, rising in the transport direction and located underneath, and transported onwards.

A guard curtain 29 in the form of a chain curtain is additionally provided obliquely to the longitudinal edge of the conveyor belt 24 in its region facing the transport belt 27, which curtain likewise restrains the lighter parts whereas heavier parts can slide through. The oblique arrangement of the chain curtain 29 relative to the transport belt 24 causes it to become clogged less easily. The mixture of valuable substances is transferred to the preliminary sorting stage 14 at the start of the belt. The materials become segregated by the impact on falling (trampoline effect) and also by the slightly oscillatory movement of the separator belt 24. Due to the oscillatory movement of the conveyor belt, a recoil effect occurs upon the three-dimensional parts, which favors the separation effect. Accordingly the friction adhesion and the trampoline effect of the separator belt 24, the vibration of the vibrator device 28 and gravity cooperate in the sorting machine. A purposeful preliminary sorting is possible by this means.

The transport belts 24, 27 may advantageously also consist of a single correspondingly shaped belt. The transport belt 27 may optionally be of trough-shaped construction.

A further separating device for parts, in the form of a brush wheel 30, is provided at the end of the lower transport belt 27 (selectively also at the upper belt 24). The rotary device illustrated with a horizontal axis of rotation 31 in FIG. 3 engages with its soft bristles the light parts 32 and throws them away tangentially, whereas the heavy parts 33 fall downward uninfluenced. The brush wheel is constructed similarly to a washing brush in a motor vehicle washing installation.

The sorting machine 14 separates the mixture of valuable substances substantially into paper and bottles or the like. These fractions are then fed to the two annuli of the sorting table.

The sorting machine 14 can also be used independently for minor sorting functions. Accordingly the protection is also extended to the independent use.

In the sorting machine described in FIGS. 3 and 4, predominantly two-dimensional lighter parts on the transport belt 24 are separated from three-dimensional parts on the transport belt 27. The principle is based upon the fact that, due to the inclined position of the transport device 24 (this is not to be understood to mean the rise of the transport device), the mixture of valuable substances charged slides downwards by gravity towards the transport device 27. Parts which remain adhering on the transport plane 25 are therefore extracted laterally from the stream of material influenced by gravity.

Figure 5:
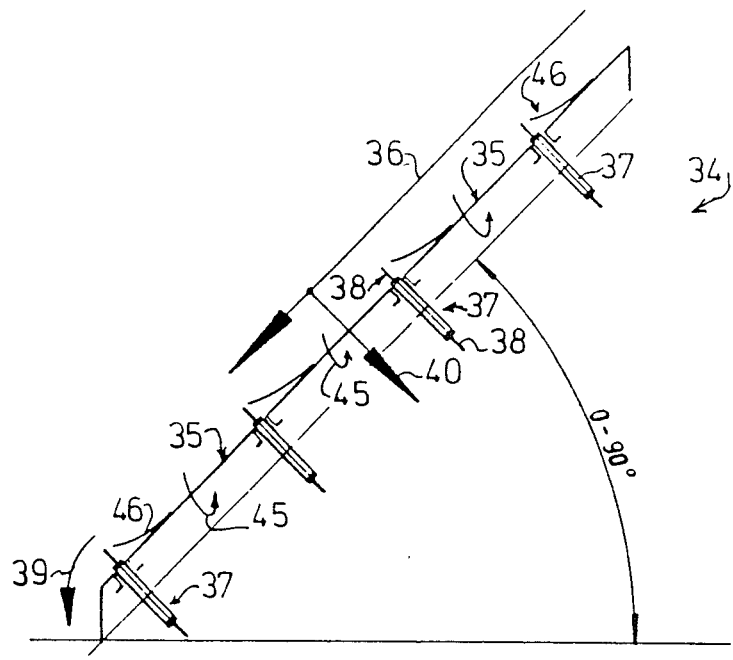
Figure 6A:
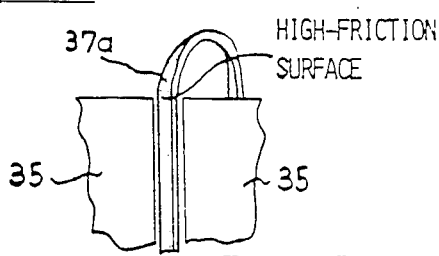
FIG. 6a is a variant of the construction of FIG. 6.
Figure 6:
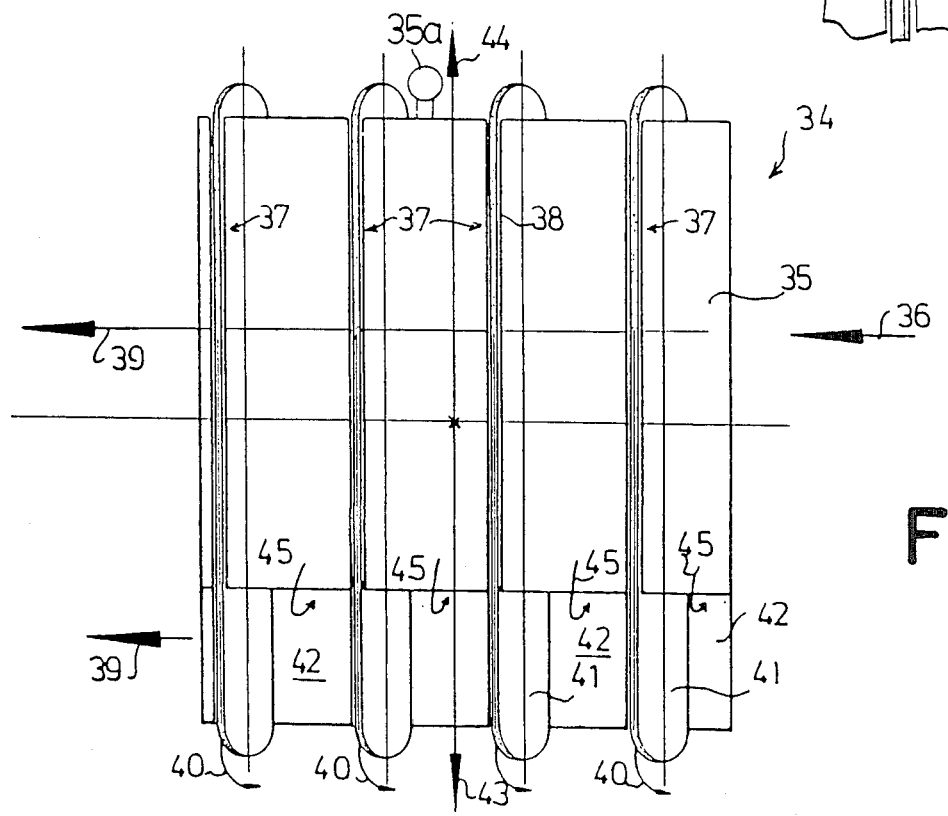

According to the variant of construction shown in FIGS. 5 and 6, a sorting machine operating on the same principle as in FIGS. 3 and 4 should be developed so that, particularly, a mechanical sorting out of textiles, bands, strings, stockings, foil strips or the like from an unsorted mixture of valuable substances is made possible. This is extremely important because, in the case of an after-sorting, by screening machines for example, these valuable substances would cause clogging there. These substances also require a particularly high outlay for manual sorting.

For this purpose the sorting machine 34 illustrated in FIGS. 5 and 6 operates identically in principle to the sorting machine 14 illustrated in FIGS. 3 and 4, that is to say the material to be sorted out is discharged out of the stream of material, which is preferably flowing by gravity, laterally or at any desired angles, to be optimized in each case, and via a suitable conveying means to the principal transport stream. In this case the transport plane 35 may be excited with an optionally superimposed movement, that is to say two-dimensional screening movement, vibration or the like, effected for example, by a conventional vibrator arrangement connected to the transport plane 35 and symbolically illustrated at 35a.

As illustrated in FIG. 5 (end elevation) and 6 (plan), the mixture of valuable substances is charged onto the inclined transport plane (article-supporting surface) 35 of the sorting device 34, the slope of which is parallel to the width dimension of the surface 35. The width dimension, in turn, is parallel to the direction designated by the arrow 36. The slope of the surface 35 may be between an angle of 0° and 90°, preferably 30° to 60°, relative to the horizontal. The principal transport direction due to gravity is designated by the arrow 36. At a right angle or other angle to this transport direction 36, this special sorting device 34 exhibits, according to the invention, auxiliary conveyor means 37 which, as illustrated in the drawing, are constructed by way of example as four revolving roller chains having pins 38 projecting into the inclined transport plane 35. However, a revolving saw blade, the teeth of which likewise project into the transport plane, may also be used instead of a roller chain. Finally, as shown in FIG. 6a, it would also be possible to use a revolving conveyor belt 37a having a high coefficient of friction, or something similar, as an addition between the roller chains or as an alternative. Materials such as textiles, bands, strings, stockings etc. are gripped reliably by the pins 38 or friction means which project into the transport plane and which constitute holding means extending continuously in an uninterrupted fashion along the article-supporting surface 35 parallel to the direction 43. Such materials are discharged out of the transport direction 36 as a separated fraction 40. The fractions are designated 39 and 40 in FIG. 6, where the fraction 39 is formed by the stream of valuable substances transported by gravity, and the fraction 40 by the stream of valuable substances (bands, strings, etc.) discharged by means of the conveyor means 37.

The end 41 of the conveyor means 37 projects in sword-shaped configuration beyond the end of the inclined transport plane 35. Beneath this a further transport device 42 is arranged, in the form of an inclined chute, for example, into which coarser parts fall down which belong to the fraction 39, but which have been entrained by the valuable substances transported by means of the conveyor means 37. A retention of these substances may optionally be achieved by a curtain similar to that in FIG. 3. The valuable substances which pass into the transport device 42 may be combined with the fraction 39. However, similarly to the function of the sorting machine 14 according to FIGS. 3 and 4, a third fraction 45 with lighter laminar substances may be discharged via the transport device 42, whereas the fraction 39 contains the heavier and/or three-dimensional substances. It is furthermore possible to combine the machines according to FIGS. 3 and 4 and according to FIGS. 5 and 6.

The valuable substances discharged laterally by the conveyor means 37 are wiped off the conveyor means at the end in that the projecting pins 38 slide into a wiping grid or the like, or in that the pins dip into a cladding.

The transport direction of the conveyor means 37 may be made in both directions. This is indicated by the arrows 43, 44. It may, particularly, also be arranged at any desired angles relative to the principal stream of valuable substances 36.

Ski-jump type deflector devices 46 may additionally be arranged in front of the respective conveyor means 37, which devices permit an easier jumping across of two-dimensional or three-dimensional parts, that is to say the fraction 39, whereas parts without internal strength are gripped by the conveyor means 37 (fraction 40).

We claim:
1. A sorting installation for separating a first type of articles from a second type of articles fed mixed to the sorting installation; the first type of articles being relatively light and substantially two-dimensional and the second type of articles being relatively heavy and substantially three-dimensional; comprising
   (a) a stationary article-supporting surface receiving the first and second type of articles in a generally mixed state; said article-supporting surface having a length dimension and a width dimension perpen- dicular to said length dimension; said article-supporting surface being inclined to the horizontal in a direction parallel to said width dimension for causing primarily said second type of articles to move by gravity downwardly on said article-supporting surface transversely to said length dimension and laterally off said article-supporting surface; and (b) conveyor means travelling parallel and relative to said article-supporting surface in a travelling direction oriented at an angle to said width dimension for forwarding primarily said first type of articles on said article-supporting surface parallel to said travelling direction and transversely to said width dimension; said conveyor means being an elongated endless conveyor oriented in said travelling direction; said endless conveyor including holding means for causing articles of the first type to be entrained by said endless conveyor in said travelling direction; said holding means extending uninterruptedly along the article-supporting surface in said travelling direction, whereby substantially all articles received on said article-supporting surface are encountering said holding means.

2. A sorting installation as defined in claim 1, wherein said angle is substantially 90°.

3. A sorting installation as defined in claim 1, further comprising vibratory means operatively connected to said article-supporting surface for imparting a vibration thereto to enhance movement by gravity of said second type of articles on said article-supporting surface.

4. A sorting installation as defined in claim 1, wherein said article-supporting surface is inclined 30°-60° to the horizontal in a direction parallel to said width dimension.

5. A sorting installation as defined in claim 1, wherein said endless conveyor has a discharge end projecting beyond said article-supporting surface in said travelling direction and receiving means situated underneath said discharge end for collecting articles of the first type transported by said endless conveyor and ejected at said discharge end thereof.

6. A sorting installation as defined in claim 1, wherein said holding means comprise a plurality of spaced, article-carrier pins attached to said endless conveyor and projecting above said article-supporting surface for engaging and entraining said first type of articles on said article-supporting surface.

7. A sorting installation as defined in claim 6, wherein said endless conveyor comprises a conveyor chain.

8. A sorting installation as defined in claim 1, wherein said endless conveyor comprises an endless conveyor belt.

9. A sorting installation as defined in claim 8, wherein said holding means comprises a material of high coefficient of friction; said conveyor belt having an article carrier surface made of said material.

10. A sorting installation as defined in claim 1, wherein said endless conveyor is present in a plurality; the endless conveyors are in a parallel-spaced, side-by-side relationship and are distributed over the width dimension of the stationary article-supporting surface.

11. A sorting instllation for separating a first type of articles from a second type of articles fed mixed to the sorting installation; the first type of articles being relatively light and substantially two-dimensional and the second type of articles being relatively heavy and substantially three-dimensional; comprising (a) a stationary article-supporting surface receiving the first and second type of articles in a generally mixed state; said article-supporting surface having a length dimension and a width dimension perpendicular to said length dimension; said article-supporting surface being inclined to the horizontal in a direction parallel to said width dimension for causing primarily said second type of articles to move by gravity downwardly on said article-supporting surface transversely to said length dimension and laterally off said article-supporting surface;

(b) conveyor means travelling parallel and relative to said article-supporting surface in a travelling direction oriented at an angle to said width dimension for forwarding primarily said first type of articles on said article-supporting surface parallel to said travelling direction and transversely to said width dimension; said conveyor means comprising a plurality of parallel-spaced, side-by-side arranged endless conveyors distributed over the stationary article-supporting surface; said endless conveyors including holding means for causing articles of the first type to be entrained by the endless conveyors in said travelling direction; and (c) stationary deflector members extending from said article-supporting surface at locations immediately above said endless conveyors and extending thereover for assisting articles of the second type to traverse by gravity said endless conveyors.

12. A sorting installation as defined in claim 11, wherein said deflector members have a ski-jump shape.

* * * * *